DESIGN

C. J. HAUCK.

Tobacco Boxes.

No. 5,916. Reissued June 16, 1874

*Witnesses.*

R. Boettler

Edward Hauck

*Inventor*

C. J. Hauck

C J Hauck

UNITED STATES PATENT OFFICE.

CHARLES J. HAUCK, OF BROOKLYN, NEW YORK.

DESIGN FOR A TOBACCO-BOX.

Specification forming part of Design No. 2,631, dated April 23, 1867; Reissue No. 5,916, dated June 16, 1874.

*To all whom it may concern:*

Be it known that I, CHARLES J. HAUCK, of 26 and 28 Stagg street, in the city of Brooklyn, and county of Kings and State of New York, have invented a Design for a Tobacco-Box; and I do hereby declare that the following is a full, clear, and exact description thereof, to enable those skilled in the art to make and use the same, reference being had to the accompanying drawings, in which—

Figure 1:
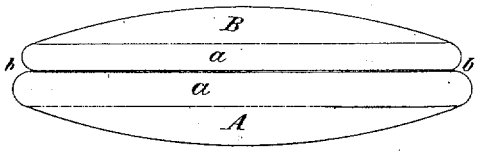
Figure 2:
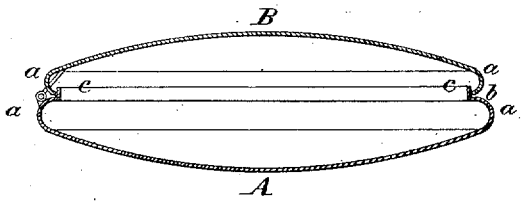

Figure 1 represents a side elevation, and Fig. 2 a central vertical section, of this invention.

Similar letters of reference indicate corresponding parts in the several figures.

This invention is fully illustrated in the accompanying drawings, A the rounded oblong body, and B the cover, each being provided with rounded edge or bead *a*, so that their peripheries are separated by fillet *b*.

*c* represents the rim, which projects into the lid and forms a bearing for the edge of the same.

What I claim as new, and desire to secure by Letters Patent, is—

1. The design of the tobacco-box provided with the beads *a a*, substantially in the manner above described.

2. The design of the box, with the rim *c* as a continuation of the body A, and joining the bead *a* of the same, substantially in the manner as and for the purpose above shown and described.

In witness whereof I hereunto set my hand this 3d day of April, 1874.

C. J. HAUCK.

In presence of—
EDWARD HAUCK,
R. BOEKLEN.